United States Patent Office 2,785,209
Patented Mar. 12, 1957

2,785,209
PROCESS FOR PREPARING AROMATIC HYDROCARBONS

Arie Schmetterling, Frankfurt am Main, and Hans Krekeler, Konigstein im Taunus, Germany, assignors to Farbwerke Hoechst Aktiengesellschaft vormals Meister Lucius & Bruning, Frankfurt am Main, Germany, a corporation of Germany No Drawing. Application August 24, 1954,
Serial No. 451,982

Claims priority, application Germany August 31, 1953

12 Claims. (Cl. 260—668)

The present invention relates to a process for preparing aromatic hydrocarbons.

It is known that mixtures of aromatic substances containing para-xylene are obtained by the aromatization (dehydrocyclization) of aliphatic hydrocarbons containing 8 carbon atoms. From n-octane, for example, a mixture is obtained containing 85 percent or ortho-xylene, 2 percent of meta-xylene, 3 percent of para-xylene and 10 percent of ethyl-benzene. 3-methylheptane or 2-ethylhexene-(1) yields mixtures of ortho- and para-xylene and also ethyl-benzene. 2.5-dimethylhexane yields 36 percent of xylene.

For the aforesaid processes there are used chromium oxide, chromium oxide/aluminum oxide or platinised carbon catalysts. It is also known that 2.2.4-trimethylpentane can be aromatised at about 550° C. in the presence of a chromium oxide/aluminum oxide catalyst or a molybdenum oxide/aluminum oxide catalyst. In the one case only ortho-xylene is obtained and in the other a mixture consisting chiefly of ortho- and para-xylene and a small amount of meta-xylene, the yield of the mixture amounting to about 10 percent.

Now, we have found that aromatic hydrocarbons, especially para-xylene, can be obtained by passing 2,4,4-trimethylpentene (1) vapor and/or 2,4,4-trimethylpentene-(2) vapor, if desired in admixture with trimethylpentane vapor, at temperatures from between about 450° C. to about 650° C., preferably from 475° C. to 550° C., over aromatization catalysts comprising metal oxides of the 6th group of the periodic system and/or mixed compounds and/or mixtures of these oxides with one another and/or mixtures of these oxides with the oxides of titanium, zirconium, thorium or vanadium, if desired also containing additions of platinum metal or palladium metal, with or without carriers consisting of oxides of the 3rd group of the periodic system and, if desired, containing as activators oxides of the alkali metal group and/or the alkaline earth metal group and/or the group of rare earth metals. The reaction may also be carried out in the presence of carrier gases, consisting preferably of hydrogen and aliphatic hydrocarbons of low molecular weight containing at most 4 carbon atoms, especially isobutylene.

The process of the invention is of special advantage since a specific product is obtained from a specific substance with the application of a definite type of catalyst. In this manner, a relatively pure para-xylene which is of high interest for industrial processes can be obtained.

As catalysts chromium oxide/aluminum oxide catalysts can be used. Particularly suitable are those consisting of chromium oxide, potassium oxide, cerium oxide and gamma-aluminum oxide and in which the proportions of the oxides may vary within the ranges of 5–40, 1–10, 0.5–5 and 93.5–45%. The preferred proportion is 12.1, 1.7, 1.5 and 84.7 parts by weight respectively. Catalysts consisting of chromium oxide/aluminum oxide and platinum metal or palladium metal can also be employed. When the first-mentioned catalysts are used, the yield of para-xylene obtained according to the process of the invention amounts to about 65 percent and with the latter catalysts it amounts to about 55 percent, a para-xylene of 98 percent strength being obtained when, for example, catalysts consisting of the above proportions of chromium oxide, potassium oxide, cerium oxide and gamma-aluminum oxide are employed at temperatures of between 475° C. and 550° C. and with a contact time of 1–12 seconds.

Suitable catalysts for the process of the invention are, for example, chromium oxide and the following mixed catalysts: Chromium oxide/aluminum oxide; molybdenum oxide/aluminum oxide; tungsten oxide/aluminum oxide; chromium oxide/molybdenum oxide/aluminum oxide; chromium oxide/zinc oxide/aluminum oxide; chromium oxide/zirconium oxide/aluminum oxide; chromium oxide/thorium oxide/aluminum oxide; chromium oxide/titanium oxide/aluminum oxide; chromium oxide/platinum metal/aluminum oxide; chromium oxide/palladium metal/aluminum oxide; chromium oxide/sodium oxide/aluminum oxide; chromium oxide/potassium oxide/aluminum oxide; chromium oxide/potassium oxide/aluminum oxide/cerium oxide; chromium oxide/potassium oxide/aluminum oxide/platinum metal; chromium oxide/potassium oxide/aluminum oxide/platinum metal/cerium oxide; chromium oxide/magnesium oxide/aluminum oxide; chromium oxide/molbydenum oxide/aluminum oxide/vanadium oxide; aluminum oxide/vanadium oxide/zinc oxide/chromium oxide; chromium oxide/calcium oxide/zinc oxide/aluminum oxide.

The catalysts advantageously contain at least 2 percent and at most 100 percent of the oxides or mixtures of the oxides of chromium, molybdenum and tungsten, preferably chromium oxide and molybdenum oxide. In some cases the use of chromium oxide is of particular advantage. These oxides may suitably be applied on carriers of aluminum oxide. For the process of the invention there come also into consideration catalysts containing, in addition to the oxides of chromium, molybdenum and tungsten, if desired also in addition to aluminum oxide, 0.1–30 percent of the oxides of titanium, zirconium, thorium, or vanadium as well as 0.5–5 percent of the rare earth metal oxides, preferably of cerium, and 1–10 percent of alkali metal oxides and 0.5–20 percent of alkaline earth metal oxides or zinc oxide, and 0.1–5 percent of palladium or platinum metal. Instead of a single oxide or metal, in all these cases a mixture of several oxides or metals of the aforesaid groups may be used.

The amounts of aluminum oxide used for preparing the above mentioned catalysts vary within the following ranges: from 0–98% when—apart from aluminum oxide—only oxides of chromium, molybdenum and tungsten are present; 0–97% when alkali metal oxides are also used; from 0–97.5% when in addition to the oxides of chromium, molybdenum and/or tungsten the catalysts contain oxides of magnesium, calcium, strontium, barium and zinc or mixtures of these oxides, from 0–97.9% when besides the oxides of chromium, molybdenum and tungsten or mixtures of these oxides there are present oxides of titanium, zirconium, thorium and vanadium or mixtures of these oxides; from 0–96.5% when rare earth metal oxides as well as alkali metal oxides are added to the oxides of chromium or molybdenum or tungsten or to the mixtures of these oxides; from 0–96.4% when the catalyst also contains oxides of titanium, zirconium, thorium and vanadium or mixtures of these oxides; from 0–96.9% in catalysts of the last-mentioned kind but not containing rare earth metal oxides; from 0–97.9% when in addition to oxides of chromium, molybdenum and tungsten there are added platinum and/or palladium; from 0–96.9% in catalysts containing also alkali metal oxides; from 0–96.4% in catalysts containing in addition thereto rare earth metal oxides. The aluminum oxide may be present in any desired form, gamma-aluminum oxide being, however, especially suitable.

The oxides of tungsten, molybdenum and chromium are advantageously applied in quantities of 10 to 20 percent. It is furthermore of advantage to add these oxides to the catalysts in quantities at least equal to or larger than the total of all other active or activating additions, the aluminum oxide not being considered as an active or activating substance.

The aluminum oxide acts exclusively as a carrier, whereas the oxides of titanium, zirconium and thorium show a slightly aromatizing action. A stronger aromatizing effect is produced by vanadium, which effect is still enhanced in the case of the group consisting of chromium, molybdenum and tungsten, chromium oxide being most effective in the formation of para-xylene by aromatization.

As activators for the preparation of para-xylene there can preferably be used alkali metal oxides, such as potassium oxide in admixture with rare earth metal oxides, for example cerium oxide. Other activators, such as alkaline earth metal oxides, zinc oxide, magnesium oxide, still increase the yield of aromatic substances; however, the proportion of para-xylene, then sometimes amounts only to 30 percent. Under appropriate conditions an aromatic product containing up to 98 percent of para-xylene is obtained from the 2.4.4-trimethylpentenes.

For carrying out the process of the invention the method of preparing the catalyst is also important. The components may be precipitated together or mixed with one another, but it is more advantageous to absorb the active components on the surface of the contact acting as carrier. A suitable contact is obtained by precipitating aluminum hydroxide from an aluminum nitrate solution with an equivalent quantity of an ammonia solution of 15 percent strength, and heating the aluminum hydroxide at 750° C. for 5 hours to convert it into $\gamma$-aluminum oxide. The resulting mass is broken up into small pieces and the particle grains of a diameter of 3–5 millimetres are sieved out. A solution of chromic acid, potassium nitrate and cerous nitrate is added dropwise to the particles so that the whole of the solution is absorbed, and while shaking to ensure uniform distribution 150 grams of the granular aluminum oxide completely absorb a solution of 31.5 grams of chromic acid, 4.5 grams of potassium nitrate and 1.5 grams of cerous nitrate in 110 cc. of water. After drying the particles for 3 hours at 550° C., and reduction in a current of hydrogen, the catalyst is ready for use.

This catalyst has a life of more than 100 hours without regeneration. The yield of para-xylene after 100 hours amounts to 95% of the yield obtained after 25 hours. After regeneration (carried out by blowing air over the catalyst at 550° C.) the catalyst regains its initial activity.

In the process of the invention the yield of para-xylene and other aromatic hydrocarbons depends on the temperature and the contact time, that is the period during which the trimethylpentene remains in the reaction zone. The higher the temperature the greater is the degree of aromatization and also the amount of splitting, so that less starting material can be recovered and consequently a smaller yield is obtained than when working at a lower temperature.

The influence of the contact time on the reaction is analogous to that of the temperature. When the contact time is increased without changing the temperature, the degree of aromatization as well as that of splitting rises. Since the splitting increases at a greater rate, the yield of aromatic hydrocarbons and para-xylene is lower. If the contact time is shortened and the temperature raised in such a manner that both factors just compensate each other with respect to splitting, an increased aromatizing effect is obtained. However, the time during which cyclization, isomerization and aromatization by dehydrogenation are to take place, must not be shortened to such an extent that insufficient dehydrogenation occurs. The process can be carried out at temperatures within the range of 450° C. to 650° C. and contact times of 0.1 to 60 seconds, and advantageously temperatures of 475° C. to 550° C. and contact times of 1 to 12 seconds.

A part of the 2.4.4-trimethylpentene used is split into gaseous products during the reaction. Up to 90 percent of these hydrocarbons of low molecular weight consist of isobutylene, which can be dimerized to 2.4.4-trimethylpentene and then used again.

As carrier gases there may be used nitrogen, hydrogen or an aliphatic hydrocarbon of low molecular weight having at most 4 carbon atoms, or a mixture of nitrogen or hydrogen with such a hydrocarbon. As compared with nitrogen, hydrogen has the advantage that it considerably reduces the deposition of carbon and condensation products of high molecular weight on the catalyst, thus prolonging the life of the latter. It is of special advantage to use as carrier gas a mixture of hydrogen and isobutylene, since splitting of the starting material to isobutylene is considerably reduced due to the presence of isobutylene. However, these hydrocarbons can be used as carrier gases only at temperatures below 550° C.

The process of the invention may be carried out continuously and, if desired, in a cyclic manner.

The use of catalysts consisting of aluminum oxide, chromium oxide, potassium oxide and cerium oxide has already been described in the literature, but it is expressly stated that as starting materials for this reaction there are used only hydrocarbons containing at least 6 carbon atoms in an open chain. It could, therefore, not be expected that 2.4.4-trimethylpentene-(1) and 2.4.4-trimethylpentene-(2) would yield aromatic hydrocarbons, and in particular para-xylene. Above all it could not be expected that especially large quantities of para-xylene would be obtained by the use of the above described catalysts consisting of chromium oxide, potassium oxide, cerium oxide and aluminum oxide.

The following examples serve to illustrate the invention, but they are not intended to limit it thereto:

*Example 1*

121.8 grams of a mixture of 80 percent of 2.4.4-trimethylpentene-(1) vapor and 20 percent of 2.4.4-trimethylpentene-(2) vapor are passed at 500° C. and at the rate of 40.6 grams per hour over 120 cc. of a catalyst consisting of chromium oxide, potassium oxide, cerium oxide and gamma-aluminum oxide (12.1, 1.7, 1.5 and 84.7 parts by weight respectively). The vapors are diluted with 13.20 liters per hour (60.0 percent by volume) of hydrogen. The contact time amounts to 7.5 seconds, the charge per unit of volume and time amounts to 0.47 cc. of 2.4.4-trimethylpentene per 1 cc. of contact room and hour. 92.4 grams (76.0 percent of the batch) of a liquid product are obtained, which contains 78.1 grams of nonreacted starting substance and 14.3 grams of aromatic substances, consisting of 14.0 grams of para-xylene, 0.2 gram of meta-xylene and 0.1 gram of ortho-xylene. The amount of starting material which undergoes conversion is 43.7 grams (35.9 percent of the batch. The yield of para-xylene of 98 percent strength amounts to 32.8 percent by weight (34.8 percent of the theoretical yield). 2.3 grams of the starting substance are lost in the form of carbon. 27.1 grams are transformed into gas. The gas contains 25.2 grams of isobutylene which yield 21.4 grams of 2.4.4-trimethylpentene on dimerization.

The final yield of para-xylene of 98 percent strength thus amounts to 64.2 percent by weight of the batch (67.8 percent of the theoretical yield).

*Example 2*

15 cc. per hour (10.9 grams per hour) of 2.4.4-trimethylpentene vapor are passed at 480° C. over 70 cc.

of the catalyst described in Example 1. The contact time amounts to 20.9 seconds. There are obtained 7.5 grams per hour of a liquid reaction product=68.6 percent, calculated upon the weight of the starting material used. The product contains 14.0 percent of aromatic substances (para-xylene of 99 percent strength), the rest is non-reacted trimethylpentene.

*Example 3*

2.4.4-trimethylpentene vapor is passed at 575° C. and with a contact time of 17.1 seconds over the catalyst described in Example 1. A liquid reaction product is obtained in a yield of 17.5 percent, calculated upon the weight of the starting material used. The liquid contains 61.7 percent of aromatic substances, 85.5 percent of which is para-xylene.

*Example 4*

2.4.4-trimethylpentene vapor is passed at 525° C. and with a contact time of 60.5 seconds over the catalyst described in Example 1. A liquid product is obtained in a yield of 10.1 percent, calculated upon the weight of the starting material used. The product contains 95.5 percent of aromatic substances (para-xylene of 79.8 percent strength).

*Example 5*

2.4.4-trimethylpentene vapor is passed at 525° C. and with a contact time of 4.1 seconds over the catalyst described in Example 1. A liquid reaction product is obtained in a yield of 68.2 percent, calculated upon the weight of the starting material. The liquid contains 18.8 percent of aromatic substances (para-xylene of 97 percent strength).

Examples 6-19 are given in the following table:

the amount of the metal oxide selected from the group consisting of chromium oxide, molybdenum oxide and tungsten oxide and mixtures thereof being at least as high as that of all other active and activating additions together.

3. A process for preparing aromatic hydrocarbons which comprises heating a compound selected from the group consisting of 2.4.4-trimethylpentene-(1), 2.4.4-trimethylpentene-(2), mixtures of these compounds and mixtures of these compounds with 2.4.4-trimethylpentane at elevated temperatures in the presence of solid oxidic cyclization catalysts containing at least 2% of a metal oxide selected from the group consisting of chromium oxide, molybdenum oxide and tungsten oxide and mixtures thereof, 0.5% to 5% of an oxide, selected from the group consisting of the oxides of the rare earth metals and mixtures thereof, 1 to 10% of a compound selected from the group consisting of the oxides of alkali metals and mixtures thereof and aluminum oxide within the range of 0 to 96.5%, the amount of the metal oxide selected from the group consisting of chromium oxide, molybdenum oxide and tungsten oxide and mixtures thereof being at least as high as that of all other active and activating additions together.

4. A process for preparing aromatic hydrocarbons which comprises heating a compound selected from the group consisting of 2.4.4-trimethylpentene-(1), 2.4.4-trimethylpentene-(2), mixtures of these compounds and mixtures of these compounds with 2.4.4-trimethylpentane at elevated temperatures in the presence of solid oxidic cyclization catalysts containing at least 2% of a metal oxide selected from the group consisting of chromium oxide, molybdenum oxide and tungsten oxide and mixtures thereof, 1% to 10% of an oxide selected from the group

| Catalyst | temperature, °C. | contact-time in seconds | liquid product of the batch in percent | percentage in the liquid product of— | |
|---|---|---|---|---|---|
| | | | | p-xylene | aromatic substance |
| (6) $Cr_2O_3$ | 525 | 7.3 | 52.0 | 14.2 | 15.1 |
| (7) $Cr_2O_3/Na_2O/Al_2O_3$ (49.5/6.0/44.5) | 525 | 6.8 | 69.2 | 14.0 | 14.7 |
| (8) $MoO_3/Al_2O_3$ (16.4/83.6) | 525 | 7.1 | 59.0 | 3.0 | 9.3 |
| (9) $Cr_2O_3/Mo_2O_3/Al_2O_3$ (22.2/23.4/54.4) | 525 | 5.8 | 41.0 | 3.5 | 20.1 |
| (10) $Cr_2O_3/ZnO/Al_2O_3$ (28.2/11.7/60.1) | 550 | 6.9 | 32.5 | 11.6 | 32.7 |
| (11) $Cr_2O_3/MgO/Al_2O_3$ (18.7/3.6/77.7) | 525 | 8.6 | 47.2 | 6.9 | 22.2 |
| (12) $Cr_2O_3/CaO/ZnO/Al_2O_3$ (26.4/8.5/7.5/57.6) | 550 | 7.0 | 30.9 | 12.8 | 33.6 |
| (13) $Cr_2O_3/ZrO_2/Al_2O_3$ (26.2/12.1/61.7) | 525 | 4.9 | 67.9 | 8.3 | 11.0 |
| (14) $Cr_2O_3/ThO_2/Al_2O_3$ (19.5/8.1/82.4) | 525 | 5.5 | 68.5 | 9.0 | 12.1 |
| (15) $Cr_2O_3/Pd/Al_2O_3$ (18.0/3.6/78.4) | 500 | 4.2 | 63.5 | 12.1 | 13.4 |
| (16) $Cr_2O_3/Pt/Al_2O_3$ (16.0/1.5/82.5) | 500 | 4.6 | 62.0 | 11.6 | 13.0 |
| (17) $Cr_2O_3/K_2O/Ce_2O_3/Pt/Al_2O_3$ (12.7/0.7/3.6/0.7/82.3) | 525 | 3.7 | 66.2 | 17.9 | 19.1 |
| (18) $Cr_2O_3/MoO_3/V_2O_5/Al_2O_3$ (14.4/17.6/18.5/49.5) | 500 | 8.5 | 40.5 | 4.2 | 20.9 |
| (19) $Cr_2O_3/V_2O_5/ZnO/Al_2O_3$ (20.5/18.4/14.8/46.3) | 525 | 6.5 | 31.0 | 8.9 | 28.5 |

We claim:

1. A process for preparing aromatic hydrocarbons which comprises heating a compound selected from the group consisting of 2.4.4-trimethylpentene-(1), 2.4.4-trimethylpentene-(2), mixtures of these compounds and mixtures of these compounds with 2.4.4-trimethylpentane at elevated temperatures in the presence of solid oxidic cyclization catalysts comprising a compound selected from the group consisting of metal oxides of chromium, molybdenum and tungsten and mixtures thereof.

2. A process for preparing aromatic hydrocarbons which comprises heating a compound selected from the group consisting of 2.4.4-trimethylpentene-(1), 2.4.4-trimethylpentene-(2), mixture of these compounds and mixtures of these compounds with 2.4.4-trimethylpentane at elevated temperatures in the presence of solid oxidic cyclization catalysts containing at least 2% of a metal oxide selected from the group consisting of chromium oxide, molybdenum oxide and tungsten oxide and mixtures thereof, 0.1 to 45% of a metal oxide selected from the group consisting of titanium oxide, zirconium oxide, thorium oxide and vanadium oxide and mixtures thereof, and aluminum oxide within the range of 0 and 97.5%, consisting of the oxides of the alkali metals and mixtures thereof and aluminum oxide within the range of 0 to 97%, the amount of the metal oxide selected from the group consisting of chromium oxide, molybdenum oxide and tungsten oxide and mixtures thereof being at least as high as that of all other active and activating additions together.

5. A process for preparing aromatic hydrocarbons which comprises heating a compound selected from the group consisting of 2.4.4-trimethylpentene-(1), 2.4.4-trimethylpentene-(2), mixtures of these compounds and mixtures of these compounds with 2.4.4-trimethylpentane at elevated temperatures in the presence of solid oxidic cyclization catalysts containing at least 2% of a metal oxide selected from the group consisting of chromium oxide, molybdenum oxide and tungsten oxide and mixtures thereof, 0.5% to 5% of an oxide, selected from the group consisting of the oxides of the rare earth metals and mixtures thereof, 1 to 10% of a compound selected from the group consisting of the oxides of alkali metals and mixtures thereof, 0.1 to 5% of a metal selected from the group consisting of palladium and platinum and mixtures thereof and aluminum oxide within the range of 0% to 96.4%, the amount of the metal oxide selected from the group consisting of chromium oxide, molybdenum oxide and tungsten oxide and mixtures thereof being at least as high as that of all other active and activating additions together.

6. A process for preparing aromatic hydrocarbons which comprises heating a compound selected from the group consisting of 2.4.4-trimethylpentene-(1), 2.4.4-trimethylpentene-(2), mixtures of these compounds and mixtures of these compounds with 2.4.4-trimethylpentane at elevated temperatures in the presence of solid oxidic cyclization catalysts comprising a content of at least 2% of a metal oxide selected from the group consisting of chromium oxide, molybdenum oxide and tungsten oxide and mixtures thereof, of 0.1% to 5% of a metal selected from the group consisting of palladium and platinum and mixtures thereof and of aluminum oxide within the range of 0 to 97.9%, the amount of the metal oxide selected from the group consisting of chromium oxide, molybdenum oxide and tungsten oxide and mixtures thereof being at least as high as that of all other active and activating additions together.

7. A process for preparing aromatic hydrocarbons which comprises heating a compound selected from the group consisting of 2.4.4-trimethylpentane-(1), 2.4.4-trimethylpentene-(2), mixtures of these compounds and mixtures of these compounds with 2.4.4-trimethylpentane at a temperature within the range of about 450° C. and 650° C. in the presence of solid oxidic cyclization catalysts comprising a metal oxide selected from the group consisting of chromium oxide, molybdenum oxide, tungsten oxide and mixtures thereof.

8. A process for preparing aromatic hydrocarbons which comprises heating a compound selected from the group consisting of 2.4.4-trimethylpentene-(1), 2.2.4-trimethylpentene-(2), mixtures of these compounds and mixtures of these compounds with 2.4.4-trimethylpentane at a temperature within the range of about 475° C. and 550° C. in the presence of solid oxidic cyclization catalysts comprising a metal oxide selected from the group consisting of chromium oxide, molybdenum oxide, tungsten oxide and mixtures thereof.

9. A process for preparing aromatic hydrocarbons which comprises heating a compound selected from the group consisting of 2.4.4-trimethylpentene-(1), 2.4.4-trimethylpentene-(2), mixtures of these compounds and mixtures of these compounds with 2.4.4-trimethylpentane at a temperature within the range of about 475° C. and 550° C. in the presence of solid oxidic cyclization catalysts comprising a metal oxide selected from the group consisting of chromium oxide, molybdenum oxide, tungsten oxide and mixtures thereof in the presence of a compound selected from the group consisting of hydrogen and lower aliphatic hydrocarbons having at most 4 carbon atoms, containing iso-butylene and mixtures thereof for a contact time within the range of about 1 and about 12 seconds.

10. A process for preparing aromatic hydrocarbons which comprises heating a compound selected from the group consisting of 2.4.4-trimethylpentene-(1), 2.4.4-trimethylpentene-(2), mixtures of these compounds and mixtures of these compounds with 2.4.4-trimethylpentane at elevated temperatures in the presence of solid oxidic cyclization catalysts comprising a metal oxide selected from the group consisting of chromium oxide, molybdenum oxide, tungsten oxide and mixtures thereof which catalysts are prepared by absorbing the active and activating components on aluminum oxide.

11. A process for preparing aromatic hydrocarbons which comprises heating a compound selected from the group consisting of 2.4.4-trimethylpentene-(1), 2.4.4-trimethylpentene-(2), mixtures of these compounds and mixtures of these compounds with 2.4.4-trimethylpentane at elevated temperatures in the presence of a catalyst comprising 5 to 40% of chromium oxide, 1 to 10% of potassium oxide, 0.5 to 5% of cerium oxide and 93.5 to 45% of γ-aluminum oxide at a temperature within the range of about 475° C. and 550° C.

12. The process defined in claim 1, wherein said heating is effected in the presence of at least one carrier gas.

References Cited in the file of this patent
UNITED STATES PATENTS

| | | |
|---|---|---|
| 2,317,683 | Greensfelder | Apr. 27, 1943 |
| 2,337,190 | Greensfelder | Dec. 21, 1943 |

OTHER REFERENCES

Komarewsky et al.: "Jour. Am. Chem. Soc.," vol. 66 (1944), 1118–1119.

Herrington et al.: Chem. Abstracts," vol. 40 (1946), col. 1796.

Plate et al.: "Chem. Abstracts," vol. 45 (951), col. 7032c.